United States Patent [19]

Melendy et al.

[11] Patent Number: 5,294,657
[45] Date of Patent: Mar. 15, 1994

[54] ADHESIVE COMPOSITION WITH DECORATIVE GLITTER

[76] Inventors: Peter S. Melendy; Dennis J. Fitzmeyer, both of 3 Merrill Industrial Dr., Hampton, N.H. 03842

[21] Appl. No.: 883,770

[22] Filed: May 15, 1992

[51] Int. Cl.⁵ .............................................. C08K 5/24
[52] U.S. Cl. .................................. 524/270; 524/272; 524/274
[58] Field of Search ...................... 524/270, 272, 274

[56] References Cited

U.S. PATENT DOCUMENTS

| Re. 30,892 | 3/1982 | Bingham et al. | 428/241 |
| 4,679,265 | 9/1988 | Coburn, Jr. | 428/40 |
| 5,041,482 | 8/1991 | Ornsteen et al. | 524/272 |

Primary Examiner—Paul R. Michl
Assistant Examiner—Edward Cain
Attorney, Agent, or Firm—Dickinson, Wright, Moon, Van Dusen & Freeman

[57] ABSTRACT

A hot melt adhesive composition includes decorative polyester glitter flakes. The compositions are designed for use at temperatures low enough that degradation of the glitter is avoided.

12 Claims, No Drawings

ADHESIVE COMPOSITION WITH DECORATIVE GLITTER

TECHNICAL FIELD

This invention relates to the art of adhesive compositions containing decorative glitter. More particularly, the invention relates to products commonly known as "hot melt" glue sticks containing polyester glitter material.

BACKGROUND ART

It is known to use glitter as a decoration in a variety of environments. Glitter, for example, has been used as a pigment for paint and liquid glue as well as in some goldleafing. Glitter was originally made only of small particles of a base metal, including gold, silver, and aluminum. In recent years, however, glitter has been made of a polyester film having a dye coat on one side and a metalized aluminum layer covered by a second dye coat on the other. The metalized coating is typically vacuum deposited, and the colored layer can comprise a dye colored epoxy.

Metal glitter used in paint was often subject to degradation by acids or bases in the liquid paint. This degradation significantly reduced the brightness of the glitter in many cases.

Metal glitter has not been included in hot melt adhesive compositions for several reasons. Metal glitter in these compositions is subject to degradation by acid tackifiers in the adhesive. Metal glitter is also very abrasive and causes unacceptable physical wear on the high shear mixers and extruders used in the manufacture of hot melt adhesives. This wear caused by the metal glitter is significant even though the equipment is often made of hardened materials because of the close tolerances required in the equipment and the reduction in efficiency when these tolerances are not met. A further disadvantage of metal glitter is that it has a high specific gravity compared to that of the adhesive composition. Thus, metal glitter tends to settle to the bottom of containers.

Polyester based glitter, on the other hand, is advantageous in that it is not subject to degradation by the tackifiers and does not cause wear on the manufacturing equipment or on the melt chamber of the glue gun itself. This is because the epoxy coating on the one side and the polyester on the other protect the metal. Moreover, the specific gravity of polyester glitter is about that of the adhesive composition, whereby polyester glitters remain suspended in the adhesive composition or settle at a low rate.

Polyester glitter, however, does suffer from the disadvantage that it is degraded by the temperatures normally required by hot melt adhesives. Normal hot melt adhesives require temperatures in the range of 380° F. to 400° F., and exposure to such temperatures for even as long as several minutes damages the polyester substrate and destroys the reflective film.

Accordingly, it has heretofore been the belief in this art that it is not possible to provide decorative glitter in hot melt adhesives.

SUMMARY OF THE INVENTION

Applicant has determined that polyester based glitter is not degraded when used in adhesive compositions if its temperature is maintained below about 350° F. This discovery arose through development work relating to "low temperature" hot melt compositions first developed by Applicant and the subject of Applicant's prior U.S. Pat. No. 5,041,482. That patent discloses hot melt compositions having operating temperatures as low as 170° F., which Applicant has discovered are compatible with the temperature requirements of polyester based glitter materials.

In addition, while temperatures below about 350° F. are not preferred for ordinary, "high temperature" hot melt adhesive compositions, temperatures such as these have been used recently in view of the popularity of Applicant's "low temperature" hot melt compositions.

In the preferred embodiments, the glitter material used in this invention is an epoxy coated polyester and can be obtained, for example, from Meadowbrook Inventions, P.O. Box 360, Barnardsville, N.J. 07924, or the Glitterex Corporation, 21 Joralemon Street, Belleville, N.J. 07109. The preferred flakes are 0.008" in diameter (size "008"), which do not clog nozzle orifices of known hot melt adhesive applicators. The composition of the invention may be formed into pellets, used in bulk hot melt applicators or shaped as known round, oval or similar glue sticks for use in the know glue gun type applicator.

The hot melt adhesive composition to which the glitter is added is preferably a mixture of ethylene-vinyl acetate copolymers having varying melt indices and a tackifying resin. Preferably, the operating temperature of the adhesive composition is less than about 320° F.

The amount of the glitter to be added to the adhesive composition depends on the intended application and the desired covering ability. The presence of the glitter does not normally affect the adhesive properties, and the main effect is the altering of the appearance of the material. The glitter does change some physical characteristics of the adhesive, however. For example, the preferred glitter absorbs electromagnetic energy in the microwave region.

This feature of the adhesive permits it to be heated (or reheated) to the application temperature range in a commonly available microwave oven. For example, a microwave safe syringe-type applicator containing the glitter adhesive material may be placed in the microwave oven to heat the adhesive to application temperature. As well, there are alternative applicator designs that are transparent to microwaves and allow heating of the glitter glue in a microwave oven. The use of syringe-type applicators and microwave heating permits the easy use of a variety of colored adhesives.

The amount of the glitter material contained in the adhesive will affect the amount of energy which is absorbed and, thus, the time required to heat the material to the preferred application temperature. It has been found that glitter in the amount of 5% by weight of the composition is adequate to permit heating in a microwave oven in a reasonable amount of time, e.g. about three minutes. An amount as low as 2% will cause heating, but the time is generally too long. About 10% is preferred to provide good color and rapid heating. Accordingly, a preferred composition for microwave heating includes at least 5% glitter.

While glitter does not generally enhance the adhesive properties of a hot melt adhesive, it does greatly enhance the appearance of the adhesive and improves its ability to visually cover the substrate on which is applied with a brilliantly colored material and, thus, to provide a decorative coating not otherwise available.

An advantage of this composition in comparison with a liquid, such as paint or liquid glue, having glitter is that the liquid is adversely affected by the presence of the glitter because the glitter prevents proper drying or curing of the liquid. The hot melt composition of the invention, however, does not suffer from that disadvantage because its hardening and adhesive properties are a function of temperature, which is not affected by the presence of the glitter.

The preferred films of the invention are also flexible enough to be applied to a variety of substrates including flexible substrates, such as fabric.

DETAILED DESCRIPTION OF THE PREFERRED EMBODIMENT

Applicant has found that concentrations of glitter in the range of 10%-20% by weight of the hot melt adhesive provide good hiding and brightness without significantly causing low temperature film cracking. Concentrations of glitter as high as 30% have been found useful, but the film cracking of compositions having 25%-30% glitter occurs at relatively high temperatures (e.g., 35°-40° F.) using Adhesive Technologies' test method AT-3. Concentrations of glitter as high as 30%-40% may be useful if flexibility of the adhesive is not required.

In manufacture of the compositions herein, temperatures in excess of 350° for more than very short durations should be avoided to prevent degradation. Acceptable, compositions have been made in high shear mixers in melt reactors, but a twin screw extruder is preferred because the pigments can be added dry directly to the compounding sections.

Examples of compositions in accordance with the invention are as follows.

TABLE I

| Item | Weight Percent |
|---|---|
| Tackifying resin | 10-60 |
| 18% EVA - Medium/low melt index | 35-85 |
| Polyester Glitter | 1-35 |

Table I sets forth an example of a "high temperature" hot-melt adhesive formulation which, while normally used at higher temperatures is capable of use at temperatures below about 350° F. Use at these temperatures permits the addition of polyester glitter without substantial degradation of the glitter.

TABLE II

| Item | Weight Percent |
|---|---|
| 18% EVA - High melt index | 10-80 |
| 18% EVA - Medium/low melt index | 0-40 |
| Tackifying resin | 0-60 |
| Wax | 0-40 |
| Polyester glitter | 1-35 |

Table II is an example of a low temperature adhesive which is designed to operate at temperatures substantially below 350° F., and preferably as low as about 170° F.

TABLE III

| Item | Parts by Weight |
|---|---|
| UE 89299 (an EVA with a melt index of 2500) | 35 |
| Escorene XS 68.16 (EVA with a melt index of 450) | 7 |
| Wingtack 86 (tackifier) | 35 |
| Polywax 500 (wax) | 7 |
| Escorez 5300 (a hydrocarbon resin) | 1 |
| Meadowbrook Epoxy coated Polyester glitter 008 × 008 × 001 | 15 |

Table III is a formulation for a preferred composition for a low temperature adhesive. "UE 89299" is the denomination of an ethylene vinyl acetate copolymer sold generally under the trademark "Ultrathene", a product of U.S.I. Chemicals. "Escorene" and "Escorez" are trademarks of Exxon Chemicals. "Polywax" is a trademark of Petrolite. "Wingtack" is a trademark of the Goodyear Tire and Rubber Company.

Other "low-temperature" adhesive compositions which are useful with the polyester glitter are set forth in Applicant's prior U.S. Pat. No. 5,041,482.

Modifications within the scope of the appended claims will be apparent to those of skill in the art.

I claim:

1. A low temperature hot-melt article having decorative glitter dispersed therein for being melted and then applied to a substrate in a liquid state, said article being made of a composition comprising a heat-meltable adhesive capable of being applied at a temperature of less than about 350° F. and said decorative glitter, wherein said decorative glitter comprises a synthetic material having a specific gravity approximately that of said heat-meltable adhesive in the liquid state.

2. A composition according to claim 1 wherein said synthetic material comprises polyester flakes.

3. A composition according to claim 1 wherein said adhesive is capable of being applied at a temperature of less than about 170° F.

4. A composition according to claim 1 wherein said adhesive comprises 10-80 percent by weight of the composition of a high melt index polymer, 0-40 percent by weight of the composition of a medium or low melt index polymer, 0-60 percent by weight of the polymer of a tackifying resin, and 0-40 percent by weight of the composition of wax.

5. A composition according to claim 4 wherein the amount of said glitter comprises 1-35 percent by weight of the composition.

6. A composition according to claim 1 wherein the weight of said decorative glitter is less than about 30% of the total weight of the composition.

7. A composition according to claim 6 wherein the weight of said decorative glitter is greater than about 10% of the weight of said composition and less than about 20% of the weight of said composition.

8. A composition according to claim 1 wherein said heat meltable adhesive comprises about 35 parts by weight of the composition of ethylene vinyl acetate with a melt index of about 2500, 7 parts by weight of the composition of ethylene vinyl acetate with a melt index of about 450, and 35 parts by weight of the composition of a tackifier.

9. A composition according to claim 8 wherein the amount of said decorative glitter is about 15 parts by weight of the composition of epoxy coated polyester glitter.

10. A composition according to claim 1 in the shape of a rod.

11. A method for heating a composition according to claim 1 comprising subjecting said composition to electromagnetic energy in the microwave region.

12. A method according to claim 11 further comprising placing said composition in a container that is substantially transparent to said electromagnetic energy.

* * * * *